UNITED STATES PATENT OFFICE.

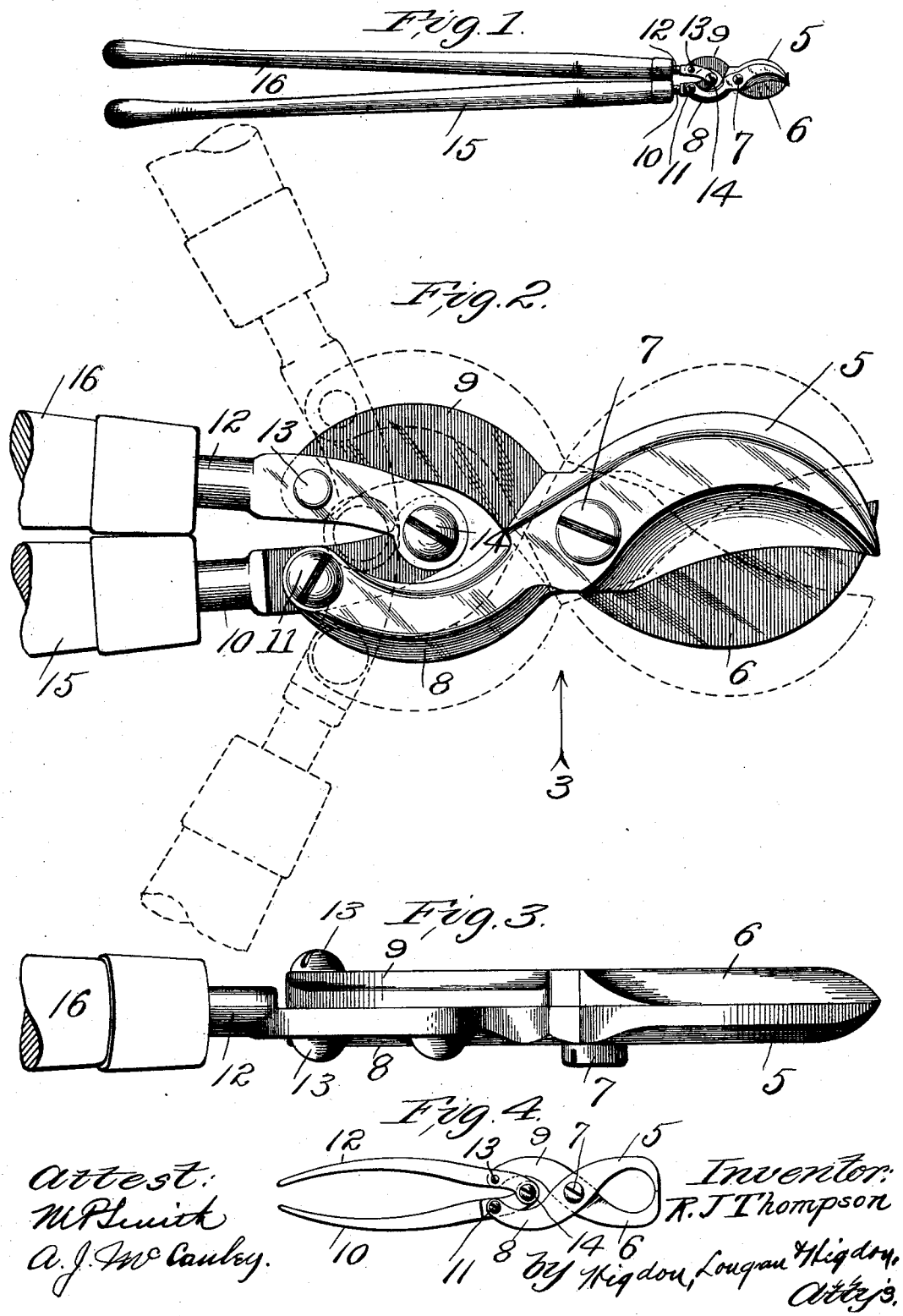

ROBERT J. THOMPSON, OF GRANDIN, MISSOURI.

HANDLE FOR PRUNING-SHEARS.

SPECIFICATION forming part of Letters Patent No. 608,490, dated August 2, 1898.

Application filed September 7, 1897. Serial No. 650,848. (No model.)

*To all whom it may concern:*

Be it known that I, ROBERT J. THOMPSON, of the city of Grandin, Carter county, State of Missouri, have invented certain new and useful Improvements in Handles for Pruning-Shears, of which the following is a full, clear, and exact description, reference being had to the accompanying drawings, forming a part hereof.

My invention relates to handles for pruning-shears and the like; and it consists of the novel construction, combination, and arrangement of parts hereinafter shown, described, and claimed.

Figure 1 is a side elevation of a pruning-shears constructed in accordance with the principles of my invention. Fig. 2 is a view analogous to Fig. 1, on an enlarged scale, parts being broken away and the operation being indicated in dotted lines. Fig. 3 is an edge view taken looking in the direction indicated by the arrow 3 in Fig. 2. Fig. 4 is a side elevation showing a modification.

Referring by numerals to the drawings, 5 and 6 are the jaws upon which the cutting edges are formed, said jaws being pivoted together by means of the screw 7, as required to form a shears. An arm 8 extends backwardly from the jaw 5 and a similar arm 9 extends from the jaw 6. The lever 10 is pivotally attached to the free end of the arm 8 by means of the screw 11 and the lever 12 is pivotally attached to the free end of the arm 9 by means of the screw 13. The lever 10 is in alinement with the arm 9 and the lever 12 is in alinement with the arm 8. The short ends of the levers 10 and 12 are pivotally connected by means of the screw 14, said screw 14 being located between the screw 7 and the screws 11 and 13 and between the arms 8 and 9. The handle 15 is attached to the long end of the lever 10 and a similar handle 16 is attached to the long end of the lever 12.

When the handles 15 and 16 are spread apart, the jaws 5 and 6 are spread apart, as indicated in dotted lines in Fig. 2, and when said handles are brought toward each other the jaws 5 and 6 will move toward each other, as in a shears. By this means I am enabled to get greater leverage with shorter handles than it would be possible to secure with the handles attached directly to the arms 8 and 9.

It is obvious that the jaws 5 and 6 may be constructed for cutting wire, as indicated in Fig. 4, or they may be constructed for pinching or be used as pipe-wrenches and for punching and other similar purposes.

I claim—

In a device of the class described, the arms 8 and 9 pivotally connected and having cutting-jaws 5 and 6 respectively formed thereon, the lever 10 pivotally connected to the free end of the arm 8, the lever 12 pivotally connected to the free end of the arm 9 so there is a short end entirely free from said arms 8 and 9 on each of the said levers 10 and 12, and a pivotal connection between the short free ends of said levers 10 and 12 at a point between the arms 8 and 9 and between the pivot connecting the arms and the pivots connecting the levers 10 and 12 to the arms 8 and 9, substantially as specified.

In testimony whereof I affix my signature in presence of two witnesses.

ROBERT J. THOMPSON.

Witnesses:
 A. C. TOLIVER,
 JOHN MCDERMOTT.